United States Patent Office 3,556,695
Patented Jan. 19, 1971

3,556,695
APEX SEAL FOR ROTARY COMBUSTION ENGINES
Kenichi Yamamoto, Hiroshima-shi, Japan, assignor to Toyo Kogyo Co., Ltd., Hiroshima-ken, Japan
Filed July 16, 1969, Ser. No. 842,106
Int. Cl. F01c 1/02, 19/04, 19/08
U.S. Cl. 418—61          5 Claims

ABSTRACT OF THE DISCLOSURE

A seal arrangement for the apexes of the rotor of a rotary piston engine, providing materials of different thermal and frictional characteristics for rubbing contact with the side walls and the peripheral housing, and providing for thermal expansion.

BACKGROUND OF THE INVENTION

This invention relates to rotary internal combustion engines of the type having a peripheral housing of epitrochoidal profile with a rotor positioned therein and rotatable relative thereto to form chambers of variable volume, and more particularly to a sealing element carried by the rotor and sweeping the peripheral wall in sealing relation therewith.

Apex seal strips of two or three pieces are known, such as that of U.S. Pat. No. 3,400,691, wherein the main seal element which sweeps the epitrochoidal housing has its radially inward edge cut at an angle at one or both ends, with a spring-pressed triangular piece bearing against the angle and urging the main strip radially outwardly, the wedging action between the meeting angular edges of the pieces maintaining the contact between the seal members and the end walls of the engine. However, it is common in such engines that the peripheral housing is formed of a different metal from the end walls and therefore has a different coefficient of friction. Also, the inner surfaces of the end walls are more easily lubricated than the peripheral housing, and their operating temperature is usually different from that of the peripheral housing. For these reasons it is often unsatisfactory to have all portions of the seal assembly of the same material, but previously no suitable arrangement was known for providing a seal strip of this type formed of differing materials which would be appropriate for the particular wear surfaces swept.

SUMMARY

The present invention overcomes these limitations of the prior art by providing a main seal strip formed of carbon or graphite which has a low coefficient of friction with the peripheral housing, especially if the latter is formed of aluminum or a light metal alloy, and one or two triangular wedging members of metal, such as steel, cast iron, modular cast iron or other metals having a relatively low coefficient of friction with the end walls and of sufficient strength to provide the necessary wedging action without chipping or becoming friable. The graphite material which is particularly suitable for a sweeping action against the peripheral wall would not be strong enough to form the triangular end pieces, but when these are made of metal they provide adequate sealing action against the end walls of the housing and the necessary wedging action to maintain seal tightness on three sides. If it is desired to have only one of the metal members act as a wedge at one end of the seal assembly, the other triangular metal piece may be brazed or fused along its mating angle to the carbon strip.

DESCRIPTION OF THE PREFERRED EMBODIMENTS

Figure 1:
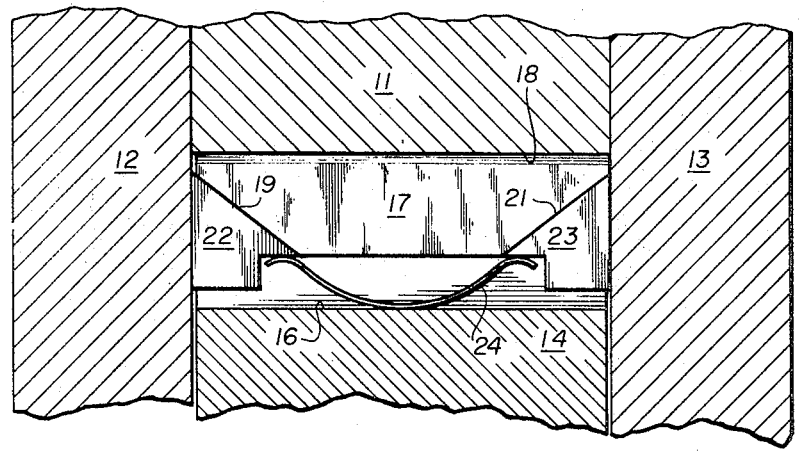
FIG. 1 is a fragmentary sectional view showing an apex seal assembly positioned in an engine.
Figure 2:
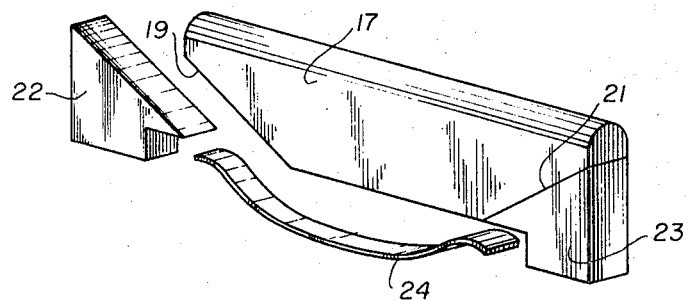
FIG. 2 is an oblique view of the seal assembly.

In FIG. 1 there is shown the apex seal assembly positioned within the seal slot at one apex of the rotor. A portion of the peripheral housing 11 is shown, flanked by the end walls 12 and 13. A rotor 14 is disposed within the housing and has a seal slot 16 at each apex portion thereof. Disposed within the seal slot is a seal assembly which includes a generally trapezoidal strip 17 formed of carbon or the like and having its radially outward edge sweeping the trochoidal inner surface 18 of the peripheral housing in sealing contact therewith. The radially inward edge of the graphite member 17 is cut off at an angle at each end along the lines 19 and 21. Abutting these angular end portions respectively are the generally triangular metal members 22 and 23, which have abutting angles congruent to those of the carbon member. A leaf spring 24 is positioned in the seal slot under the seal assembly, and bears against each of the triangular members 22 and 23 to hold the sealing edge of member 17 in contact with the peripheral housing and pieces 22 and 23 in sealing contact with the end walls, by means of the wedging action along one or both of the angles 19 and 21.

As described above, the seal assembly comprises three operating pieces, that is, the longitudinal seal strip 17 and two triangular end pieces 22 and 23. However, one of the end pieces, such as 23, is preferably integrally fixed to the graphite member along the line 21. This is accomplished by depositing a metallic plating film or metallic fusing film on the edge of strip 17 along the angle 21, to which the metal member 23 may be joined by brazing material, or by a directly fused joint by means of one of the known sealing alloys for glass-to-metal, such as various alloys of iron-nickel or iron-nickel-cobalt.

With such a two-piece arrangement, with one free triangular piece wedging the assembly in the axial and radially outward directions, there will be no axial movement of the longitudinal seal strip, while at the same time there is allowed resilient radial deflection against the spring pressure. The longitudinal seal strip is made slightly shorter than the distance between the end walls in the cold state, which allows for necessary thermal expansion of the seal strip without digging into the end walls during hot operation.

Although the invention has been described above in a preferred embodiment, it will be understood by those skilled in the art that modifications may be made without departing from the scope of the invention. It is intended to cover all such modifications by the appended claims.

What is claimed is:
1. In a rotary combination engine having a housing with a peripheral wall and a pair of parallel end walls, and a generally polygonal rotor with a plurality of apex portions disposed within the housing for rotation relative thereto and forming with the housing a plurality of variable-volume working chanmbers, the improvement comprising:
   (a) a sealing arrangement for the working chambers of the engine comprising in combination a main steal piece disposed in a groove in each apex portion of the rotor and having its radially outward edge in sweeping sealing engagement with the peripheral wall and having the ends of its radially outward edge substantially in contact with the end walls, the main seal piece being formed of a material composed principally of carbon,

(b) at least one end face of the main seal piece being slanted axially inwardly from the radially outward edge to the radially inward edge, (c) at least one secondary seal piece of triangular form and composed of metal disposed in the apex groove with one edge of its triangle in sweeping sealing contact with one end wall, a second edge of its triangle in sliding wedging contact with the slanted end face of the main seal piece, and the third edge of its trangle facing the groove bottom, and (d) a spring disposed in the groove and bearing against the groove bottom and against the third edge of the secondary seal piece and providing pressure thereagainst to maintain wedging relation between the secondary seal piece and the main seal piece to hold the main seal piece under radially outward pressure against the peripheral wall and the secondary seal piece under axially outward pressure against the end wall.

2. The combination recited in claim 1, wherein both end faces of the main seal piece are slanted axially inwardly from the radially outward edge to the radially inward edge, and there are two secondary seal pieces disposed in the groove, one at each slanted end face of the main seal piece and in sliding wedging contact therewith, each of the secondary seal pieces being also in sweeping seal contact with its associated end wall.

3. The combination recited in claim 2, wherein the peripheral housing is formed of light weight metal composed principally of aluminum, and the end walls are formed of metal composed pricnipally of iron.

4. The combination recited in claim 1, wherein both end faces of the main seal piece are slanted axially inwardly from the radially outward edge to the radially inward edge, there is one secondary seal piece disposed in the groove with one edge in sliding wedging contact with the end face of the main seal piece and one edge in sweeping sealing contact with its associated end wall, and another secondary seal piece with one edge brazed to the end face of the main seal piece and one edge in sweeping sealing contact with its associated end wall.

5. The combination recited in claim 4, wherein the peripheral housing is formed of light weight metal composed principally of aluminum, and the end walls are fomred of metal composed principally of iron.

References Cited
UNITED STATES PATENTS

| | | | |
|---|---|---|---|
| 3,194,488 | 7/1965 | Fuhrmann | 123—8SS |
| 3,235,171 | 2/1966 | Frenzel et al. | 123—8SS |
| 3,300,124 | 1/1967 | Jones | 123—8SS |
| 3,398,884 | 8/1968 | Kaatz et al. | 123—8SS |
| 3,400,691 | 9/1968 | Jones | 123—8SS |
| 3,485,217 | 12/1969 | Irgens | 123—8SS |

CARLTON R. CROYLE, Primary Examiner

W. J. GOODLIN, Assistant Examiner

U.S. Cl. X.R.

418—121, 122

UNITED STATES PATENT OFFICE
CERTIFICATE OF CORRECTION

Patent No. 3,556,695         Dated Jan. 19, 1971

Inventor(s) Kenichi Yamamoto

It is certified that error appears in the above-identified patent and that said Letters Patent are hereby corrected as shown below:

Column 1, line 58 "modular" should read --nodular--.
Column 2, line 57 "combination" should read --combustion--; line 62 "chanmbers" should read -- chambers--; line 66 "ste should read --seal--. Column 3, line 27 "seal" should read --sealing--; line 31 "pricnipally" should read --principall: Column 4, line 14 "fomred" should read --formed--.

Signed and sealed this 8th day of June 1971.

(SEAL)
Attest:

EDWARD M. FLETCHER, JR.
Attesting Officer

WILLIAM E. SCHUYLER, JR.
Commissioner of Patents